(12) United States Patent
An et al.

(10) Patent No.: US 11,153,942 B2
(45) Date of Patent: Oct. 19, 2021

(54) INDUCTION HEATING DEVICE HAVING IMPROVED INDICATOR STRUCTURE

(71) Applicant: LG Electronics Inc., Seoul (KR)

(72) Inventors: Hyo Jin An, Seoul (KR); Younghwan Kwack, Seoul (KR); Seongho Son, Seoul (KR); Jaekyung Yang, Seoul (KR); Yongsoo Lee, Seoul (KR)

(73) Assignee: LG Electronics Inc., Seoul (KR)

(*) Notice: Subject to any disclaimer, the term of this patent is extended or adjusted under 35 U.S.C. 154(b) by 359 days.

(21) Appl. No.: 16/198,194

(22) Filed: Nov. 21, 2018

(65) Prior Publication Data

US 2019/0297685 A1 Sep. 26, 2019

(30) Foreign Application Priority Data

Mar. 23, 2018 (KR) .................... 10-2018-0034067

(51) Int. Cl.
*H05B 6/12* (2006.01)
*H05B 6/10* (2006.01)
*H05B 6/06* (2006.01)

(52) U.S. Cl.
CPC .......... *H05B 6/1218* (2013.01); *H05B 6/065* (2013.01); *H05B 6/1254* (2013.01); *H05B 6/1263* (2013.01); *H05B 6/1272* (2013.01); *H05B 2206/022* (2013.01); *H05B 2213/03* (2013.01)

(58) Field of Classification Search
CPC .... H05B 6/1263; H05B 6/1254; H05B 6/065; H05B 6/1218; H05B 6/1272; H05B 2206/022; H05B 2213/03; Y02B 40/00

USPC .......... 219/622, 626, 630, 635, 660, 443.1, 219/462.1, 482; 99/337, 341, 342, 99/DIG. 14; 126/213; 427/287; 428/210
See application file for complete search history.

(56) References Cited

FOREIGN PATENT DOCUMENTS

| DE | 102008027220 | 12/2009 |
|----|--------------|---------|
| DE | 112013004163 | 5/2015 |
| EP | 1213543 | 6/2002 |
| EP | 2252129 | 11/2010 |
| JP | 02150403 A * | 6/1990 |
| JP | 3770154 B2 | 4/2006 |
| JP | 2012079580 | 4/2012 |

(Continued)

OTHER PUBLICATIONS

Translation of DE 112013004163, Induction Heating Device, May 13, 2015, ProQuest (Year: 2015).*

(Continued)

*Primary Examiner* — Quang T Van
(74) *Attorney, Agent, or Firm* — Fish & Richardson P.C.

(57) ABSTRACT

An induction heating device includes a casing, a cover plate coupled to a top of the casing, and a first induction heating module located within the casing and configured to heat an object on the cover plate. The first induction heating module includes: a working coil; an inverter configured to apply a resonant current to the working coil; a light guide located outside of the working coil, where the light guide includes a light-emission surface that is located at a top of the light guide, that is configured to indicate whether the working coil is driven, and that is configured to indicate an intensity of the working coil; a light emitting element vertically located below the light guide and configured to emit light to the light guide; and a control module configured to control the inverter and the light emitting element.

19 Claims, 9 Drawing Sheets

(56) References Cited

FOREIGN PATENT DOCUMENTS

| | | |
|---|---|---|
| JP | 2014044809 | 3/2014 |
| JP | 2014116088 | 6/2014 |
| JP | 6052585 B2 | 12/2016 |
| KR | 1020000029608 | 5/2000 |
| WO | WO-2011154373 A1 * 12/2011 | ........... H05B 6/1263 |

OTHER PUBLICATIONS

Extended European Search Report in European Application No. 19162752.0, dated Jul. 23, 2019, 8 pages.

* cited by examiner

FIG. 1

RELATED ART

FIG. 2

RELATED ART

FIG. 3

RELATED ART

INDUCTION HEATING DEVICE HAVING IMPROVED INDICATOR STRUCTURE

CROSS-REFERENCE TO RELATED APPLICATIONS

This application claims the priority of Korean Patent Application No. 10-2018-0034067, filed on Mar. 23, 2018, in the Korean Intellectual Property Office, the disclosure of which is hereby incorporated by reference in its entirety.

FIELD

The present disclosure relates to an induction heating device having an improved indicator structure.

BACKGROUND

Cooking devices may use various heating methods to heat food. For example, gas ranges use gas as fuel. In some examples, cooking devices may heat a loaded object such as a cooking vessel or a pot using electricity.

Various methods of heating a loaded object using electricity may be divided into a resistive heating type and an inductive heating type. In the electrical resistive heating method, heat may be generated based on current flowing through a metal resistance wire or a non-metallic heating element such as silicon carbide. In this method, heat may be transmitted to the loaded object through radiation or conduction to heat the loaded object. In the inductive heating method, an eddy current may be generated in the loaded object made of metal based on a high-frequency power of a predetermined magnitude applied to a working coil. In this method, the loaded object may be heated by the eddy current generated based on magnetic field around the working coil.

For example, the induction heating method may be performed as follows. When power is applied to the induction heating device, a high-frequency voltage of a predetermined magnitude is applied to the working coil. As a result, an inductive magnetic field is generated around the working coil disposed in the induction heating device. When the flux of the inductive magnetic field passes through a bottom of the loaded object containing the metal loaded on the induction heating device, an eddy current is generated inside of the bottom of the loaded object. When the resulting eddy current flows in the bottom of the loaded object, the loaded object itself is heated.

In some cases, an induction heating device may include a plurality of working coils, each working coil corresponding to a heating region to heat one of a plurality of loaded-objects (e.g., a cooking vessel).

In some cases, an induction heating device may heat a single object using a plurality of working coils simultaneously. This device may be referred to as a zone-free based induction heating device.

In some cases of the zone-free based induction heating device, the loaded-object may be inductively heated in a heating zone corresponding to a plurality of working coils, regardless of a size and loaded position of the loaded-object.

Figure 1:
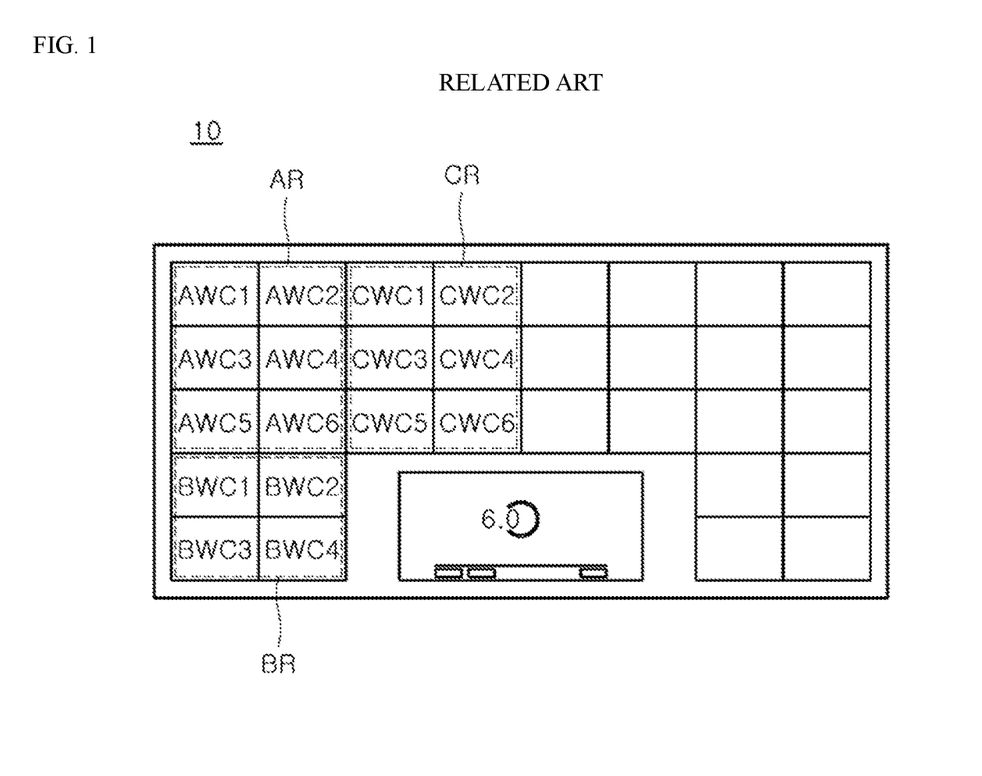
FIG. 1 is a schematic diagram illustrating a zone-free based inductive-heating device in related art.

FIG. 1 illustrates an example zone-free based inductive-heating device in related art.

As shown in FIG. 1, a plurality of working coils (for example, AWC1 to AWC6, BWC1 to BWC4, and CWC1 to CWC6) are uniformly distributed in the zone-free based induction heating device 10. In this example, the loaded-object thereon may be inductively heated with the plurality of working coils irrespective of the size and position of the loaded-object.

In some cases, in the zone-free based induction heating device 10, the heating region is divided into a plurality of heating sub-regions. These sub-regions include, for example, an A sub-region AR, a B sub-region BR, and a C sub-region CR. Each sub-region may include a plurality of working coils. For example, the A sub-region AR, the B sub-region BR, and the C sub-region CR have, respectively, a group of six working coils AWC1 to AWC6, a group of four working coils BWC1 to BWC4, and a group of six working coils CWC1 to CWC6. In some examples, an inverter that controls the working coils in a corresponding sub-region may be provided on a sub-region basis. In this case, it may be difficult to independently control each working coil in each sub-region.

Figure 2:
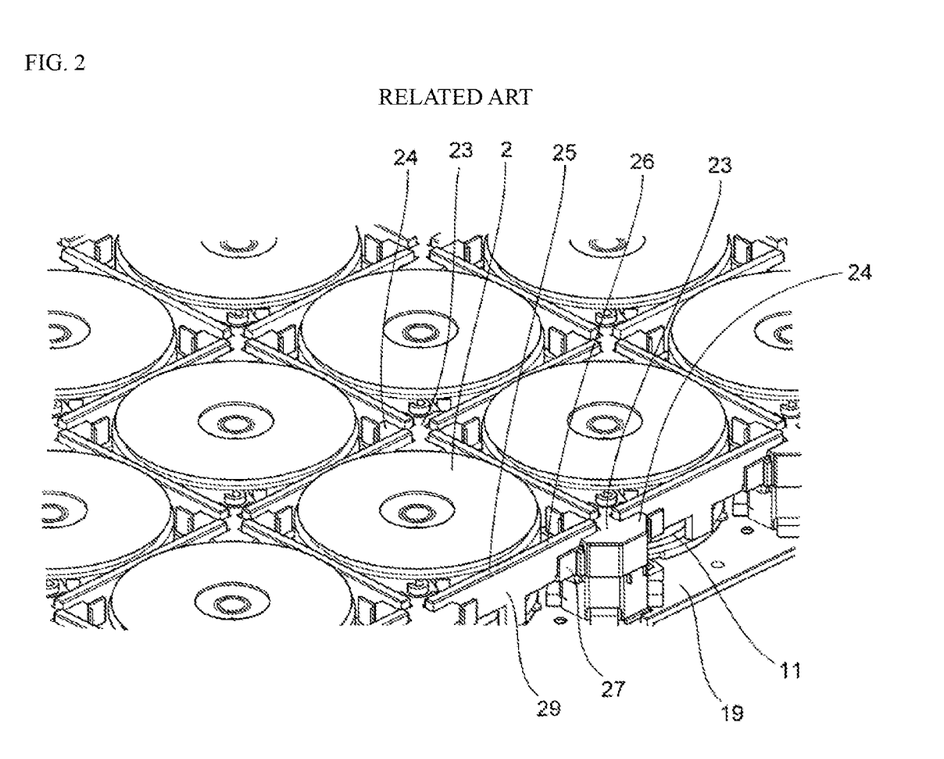
FIG. 2 is a schematic diagram illustrating an example of an indicator structure of an induction heating device in related art.
Figure 3:
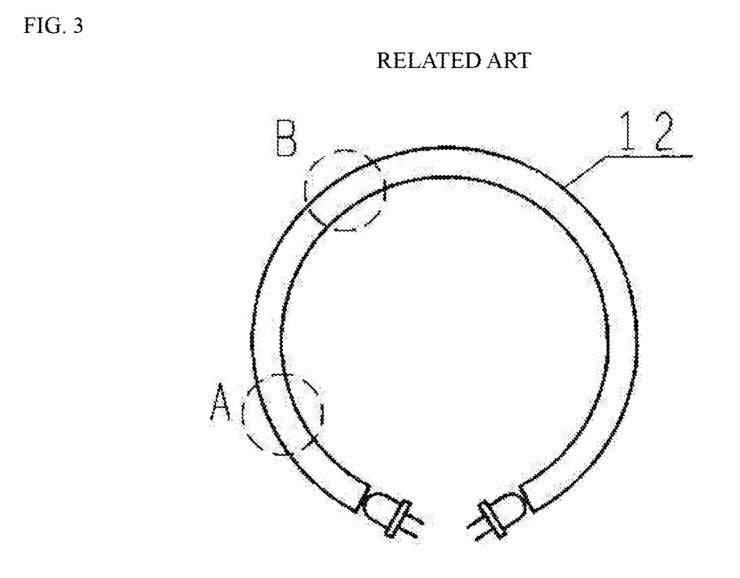
FIG. 3 is a schematic diagram illustrating another example of an indicator structure of an induction heating device in related art.

In some cases, an induction heating device such as flex or dual-based induction heating device or the zone-free based induction heating device shown in FIG. 1 may include an indicator. Referring to FIG. 2 and FIG. 3, a structure of the indicator in the induction heating device will be described below.

FIG. 2 is a schematic diagram illustrating an example of the indicator structure of the induction heating device in related art. FIG. 3 is a schematic diagram illustrating another example of the indicator structure of the induction heating device in related art.

As illustrated in FIG. 2, each of the indicators of the induction heating device includes each of light-guide units 25 arranged to surround each of working coils 2, and each of light emitting display units 23 disposed between the light-guide units 25.

In some cases, a light emitting element is disposed inside the light emitting display unit 23 and is located close to a loading plate of the induction heating device. The loading plate refers to a top face portion of a cover plate on which the object to be heated is placed. The loading plate may be in direct contact with the loaded-object to be heated. In some cases, the light emitting element may be vulnerable to heat (e.g., heat from the loading plate).

In some cases, a light emitting display casing 24 in which the light emitting element is disposed may be in contact with a compressive coil spring 11, which may make it difficult to repair the light emitting element.

In some cases, as illustrated in FIG. 3, the indicator of the induction heating device may include an annular or circular shaped light guide 12. In some cases where the light guide 12 has a light reflection layer. It is of interest to mitigate heat generation and facilitate repair in case of failure.

SUMMARY

One purpose of the present disclosure is to provide an induction heating device, in which each working coil has a modular structure so that each of a plurality of working coils may be independently controlled.

Another purpose of the present disclosure is to provide an induction heating device in which heat resistance and light emitting performances of the indicator are improved.

Still another purpose of the present disclosure is to provide an induction heating device in which a structure of the indicator is simplified.

The purposes of the present disclosure are not limited to the above-mentioned purposes. Other purposes and advantages of the present disclosure, as not mentioned above, may be understood from the following descriptions and more clearly understood from the implementations of the present disclosure. In some implementations, it will be readily appreciated that the objects and advantages of the present disclosure may be realized by features and combinations thereof as disclosed in the claims.

According to one aspect of the subject matter described in this application, an induction heating device includes a casing, a cover plate coupled to a top of the casing, the cover plate having a surface configured to seat an object, and a first induction heating module located within the casing and configured to heat the object on the cover plate. The first induction heating module includes a working coil, an inverter configured to apply a resonant current to the working coil, a light guide located outside of the working coil, wherein the light guide includes a light-emission surface that is located at a top of the light guide, that is configured to indicate whether the working coil is driven, and that is configured to indicate an intensity of the working coil, a light emitting element located vertically below the light guide and configured to emit light to the light guide, and a control module configured to control the inverter and the light emitting element.

Implementations according to this aspect may include one or more of the following features. For example, the control module may include a printed circuit board (PCB), and the light emitting element and the inverter may be disposed on the PCB of the control module. In some examples, the light guide includes an upper layer that accommodates air and a lower layer that is made of an acrylic material. In some examples, a vertical length of the upper layer may be equal to a vertical length of the lower layer. In some examples, the light-emission surface is a top surface of the upper layer.

In some implementations, the induction heating device may further include a heat sink located vertically below the first induction heating module and configured to dissipate heat from the first induction heating module. In some examples, the inverter may include a first switching element and a second switching element that are located vertically above the heat sink and that are configured to perform a switching operation to apply the resonant current to the working coil. In some examples, each of the first switching element and the second switching element includes an insulated gate bipolar transistor (IGBT).

In some implementations, the induction heating device may further include: a second induction heating module located within the casing, where the first induction heating module and the second induction heating module are arranged in a first direction; and a third induction heating module located within the casing, wherein the first induction heating module and the third induction heating module are arranged in a second direction perpendicular to the first direction.

In some implementations, the first induction heating module further includes a ferrite core located vertically below the working coil and configured to diffuse magnetic field generated from the working coil, and an insulation member that is located between the ferrite core and the control module and that is configured to reduce heat transfer to the control module. In some examples, the first induction heating module further includes a module casing that defines an accommodation space configured to accommodate the working coil, the ferrite core, and the insulation member that are vertically stacked. The module casing may further define a guide-receiving groove around the accommodation space, and the light guide may be configured to insert into and couple to the guide-receiving groove.

In some implementations, a top surface of the light guide is flush with a top surface of the module casing in a state in which the light guide is inserted in the guide-receiving groove. In some examples, the light guide includes a plurality of light guides that each have a planar shape, where each light guide may be configured to cover a side of the working coil. In some examples, each light guide includes an upper layer that accommodates air and a lower layer that is made of an acrylic material, the upper layer being configured to reduce heat transfer from the object on the cover plate.

In some implementations, the light emitting element includes a plurality of light emitting elements that are spaced apart from each other and that are located at a side of the working coil.

According to another aspect, an induction heating device includes a casing, a cover plate coupled to a top of the casing, where the cover plate has a surface configured to seat an object, and a plurality of induction heating modules located within the casing and configured to heat the object on the cover plate. Each induction heating module includes: a working coil; an inverter configured to apply a resonant current to the working coil; a light guide located outside of the working coil, where the light guide includes a light-emission surface that is located at a top of the light guide, that is configured to indicate whether the working coil is driven, and that is configured to indicate an output intensity of the working coil; a light emitting element located vertically below the light guide and configured to emit light to the light guide; and a control module configured to control the inverter and the light emitting element.

Implementations according to this aspect may include one or more of the following features. For example, each induction heating module may further include a ferrite core located vertically below the working coil and configured to diffuse magnetic field generated from the working coil, and an insulation member that is located between the ferrite core and the control module and that is configured to reduce heat transfer from the object to the control module. In some examples, each induction heating module may further include a module casing that defines an accommodation space configured to accommodate the working coil, the ferrite core, and the insulation member that are vertically stacked. The module casing may further define a guide-receiving groove around the accommodation space, and the light guide may be configured to insert into and couple to the guide-receiving groove.

In some implementations, each control module includes a PCB that is configured to mount the light emitting element and the inverter of each induction heating module.

In some implementations, the plurality of induction heating modules include: a first induction heating module; a second induction heating module that faces the first induction heating module, where the first induction heating module and the second induction heating module are arranged in a first direction; and a third induction heating module that faces the first induction heating module, where the first induction heating module and the third induction heating module are arranged in a second direction perpendicular to the first direction.

Further specific effects of the present disclosure as well as the effects as described above will be described with illustrations of specific details for carrying out the disclosure.

BRIEF DESCRIPTION OF DRAWINGS

Throughout the drawings, like reference numerals refer to like elements.

DETAILED DESCRIPTION

Hereinafter, an inductive-heating device according to one implementation of the present disclosure is illustrated.

Figure 4:
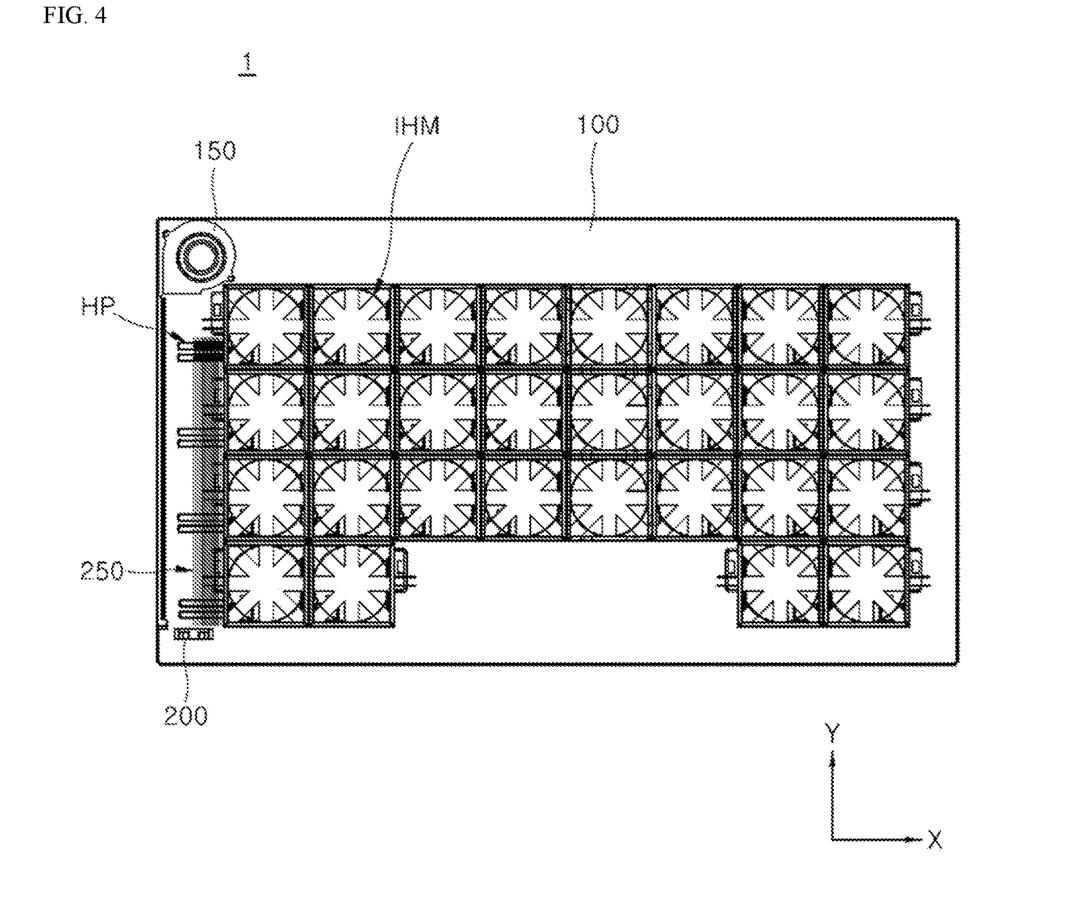
FIG. 4 is a top view of an example induction heating device according to one implementation of the present disclosure.
Figure 5:
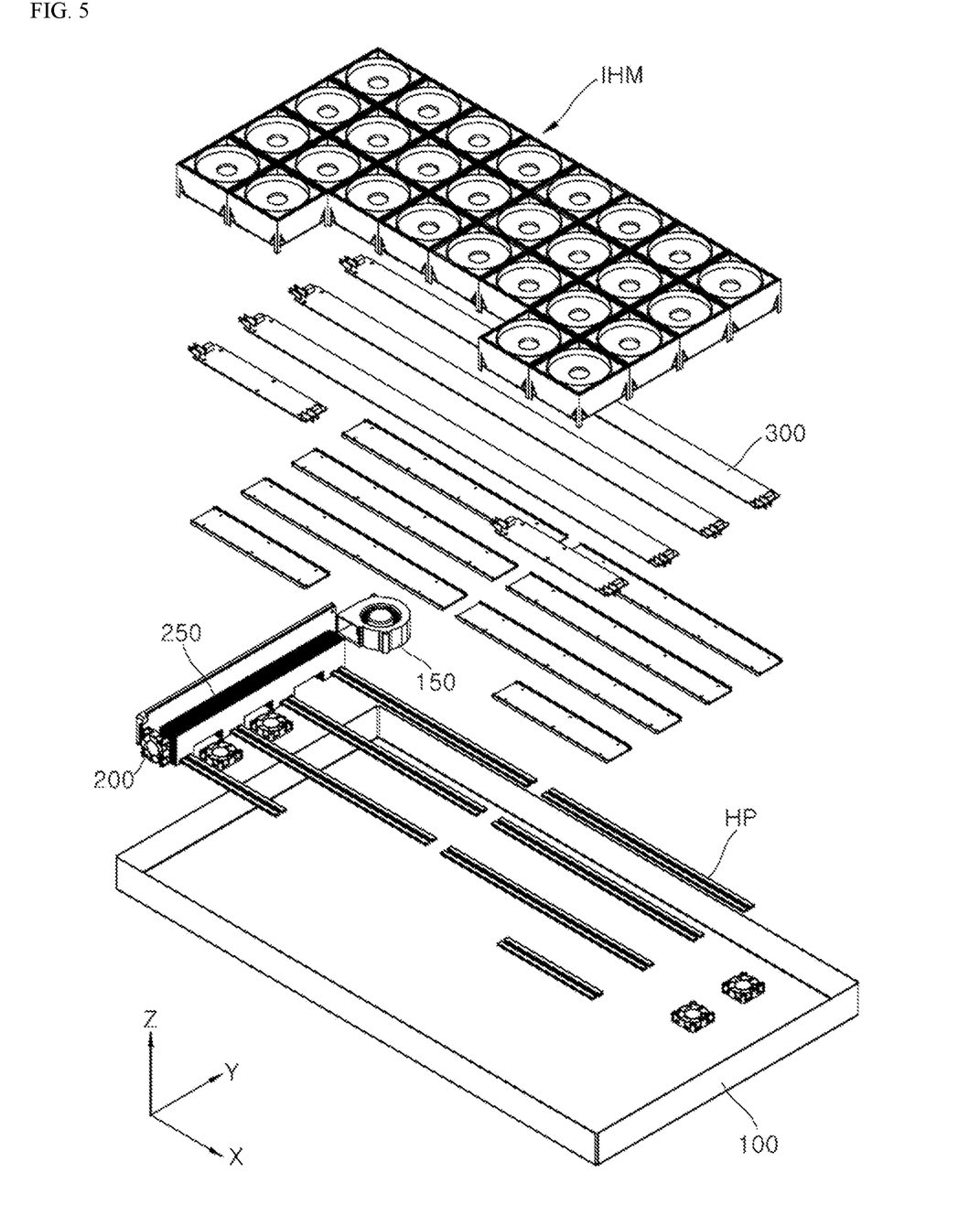
FIG. 5 is an exploded perspective view of the induction heating device of FIG. 4.
Figure 6:
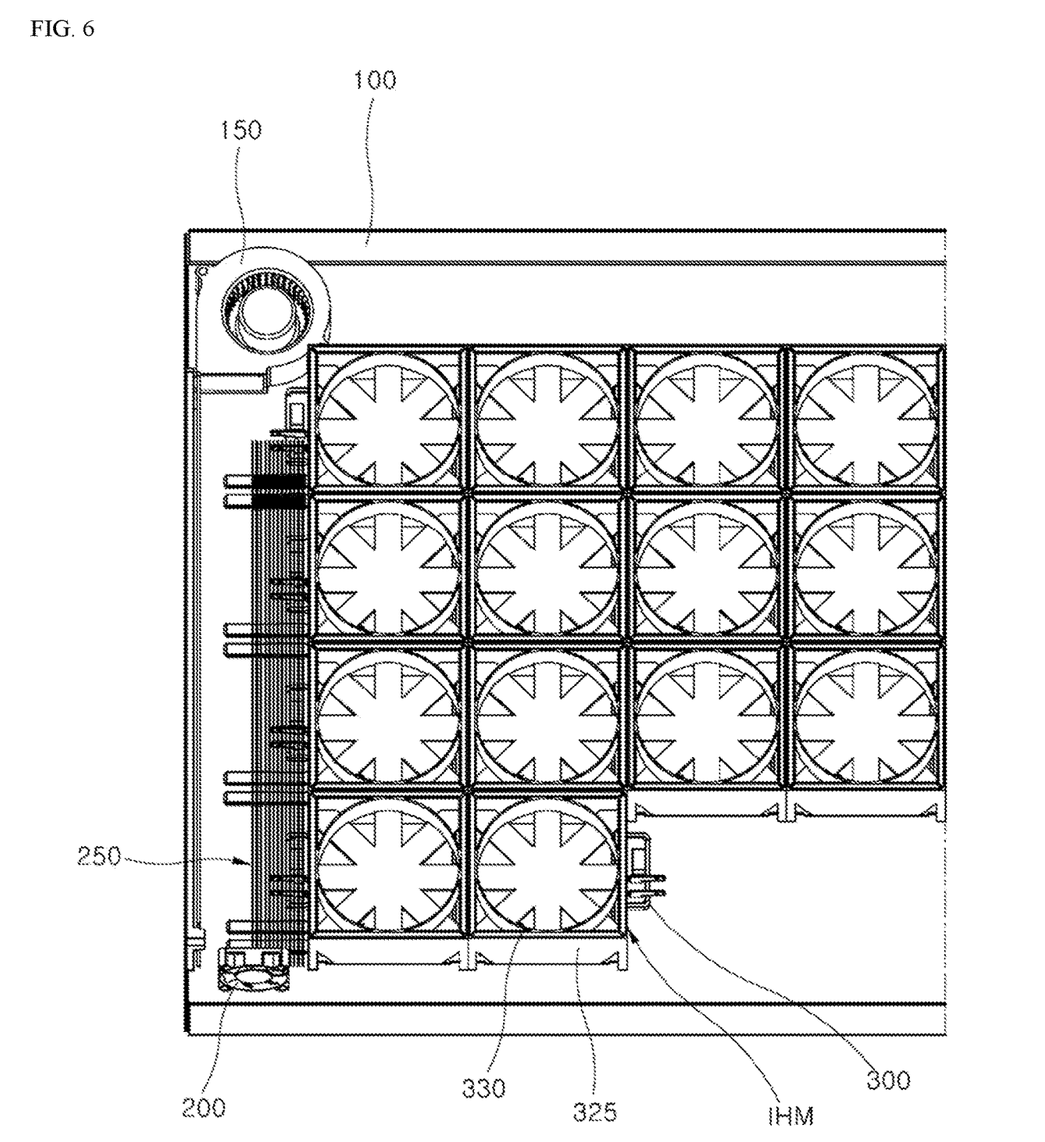
FIG. 6 is a partial perspective view of the induction heating device of FIG. 4.

FIG. 4 is a top view of an example induction heating device according to one implementation of the present disclosure. FIG. 5 is an exploded perspective view of the induction heating device of FIG. 4. FIG. 6 is a partial perspective view of the induction heating device of FIG. 4.

Referring first to FIG. 4 and FIG. 5, an induction heating device 1 includes a casing 100, a cover plate, a plurality of induction heating modules (IHMs in following figures), a plurality of heat pipes (HPs in following figures), a plurality of wiring substrates 300, an air-discharge fan 150, a cooling fan 200, and a blowing-guide 250.

In some implementations, the numbers of the induction heating modules JIM, heat pipes HP, wiring substrates 300, air-discharge fans 150, cooling fans 200, and blowing-guides 250 as shown in FIG. 4 and FIG. 5 may vary depending on the size of the casing 100, or a device performance. However, for convenience of illustration, the number of each component as shown in FIG. 4 and FIG. 5 will be exemplified.

The casing 100 houses therein the various components constituting the induction heating device 1, such as the plurality of induction heating modules (IHMs in following figures), the plurality of heat pipes (HPs in following figures), the plurality of wiring substrates 300, the air-discharge fan 150, the cooling fan 200 and the blowing-guide 250.

In some implementations, although not shown in the drawing, the casing 100 may further house a power supply that supplies power to various components such as the induction heating module IHM, the air-discharge fan 150, and the cooling fan 200. A cover plate may be coupled to a top of the casing 100. A heat sink 315 (see FIG. 7) may be placed below an inverter 310 (see FIG. 7) of each induction heating module IHM.

Each of the multiple induction heating modules (for example, IHMs) may be individually connected to each power supply. Alternatively, in some implementations, a single power supply that supplies power to the various components in common may be installed in the casing 100. The latter will be described below.

In some implementations, the cover plate is coupled to an upper end of the casing 100 to seal an inside of the casing 100. A loaded-object to be heated such as a cooking vessel may be disposed on a top face of the cover plate. The cover plate may include a loading plate for loading thereon the loaded-object, such as a cooking vessel.

In this connection, the loading plate may be made of, for example, a glass material. The loading plate may include an input interface that receives input from a user and transfers the input to a control module (340 in FIG. 7) as described below.

In some implementations, the input interface transfers the input provided from the user not to a control module (340 in FIG. 7) (that is, a control module for the induction heating module IHM) as described later, but to a control module for the input interface. The input interface control module may transmit the input to the control module (340 in FIG. 7), which will be described later. The details of this will be omitted.

In some implementations, heat generated from the induction heating module IHM may be transferred through the loading plate to the loaded-object thereon. In addition, the casing 100 may be thermally insulated to prevent the heat generated by the induction heating module IHM from leaking to the outside.

The air-discharge fan 150 is installed at one corner inside the casing 100. The air-discharge fan 150 may discharge air inside the casing 100 to the outside of the casing 100. The cooling fan 200 is installed inside the casing 100 at a corner opposite to the air-discharge fan 150. The cooling fan 200 blows air to the air-discharge fan 150.

In some examples, the air-discharge fan 150 may suction the discharged air or wind from the cooling fan 200 and discharge the air or wind to the outside of the casing 100.

In some cases, the air discharged from the cooling fan 200 may be guided by the blowing-guide 250 and may be transmitted to the air-discharge fan 150. The air guided by the blowing-guide 250 may flow while cooling the heat of the heat pipe HP.

That is, as shown in FIG. 4, one end of the heat pipe HP protruding beyond the induction heating module IHM may be disposed on an air-flow path between the cooling fan 200 and the air-discharge fan 150. Thereby, the air guided by the blowing-guide 250 may flow while cooling the heat pipe HP.

In some implementations, the cooling fan 200 and the air-discharge fan 150 are respectively installed at the opposite corners inside the casing 100. The cooling fan 200 and the air-discharge fan 150 are not provided for each of the plurality of induction heating modules, but are provided commonly for the plurality of induction heating modules. This makes it possible to reduce the number of cooling-fans and air-discharge fans.

In some implementations, the cooling fan 200 and the air-discharge fan 150 are respectively installed only at the opposite corners inside the casing 100. An available inner space in the casing 100 may increase.

In some implementations, although not shown in the drawing, when the induction heating device 1 further includes an additional cooling fan and an additional air-discharge fan. In this case, the additional cooling fan and the additional air-discharge fan may be respectively installed at further opposite corners which are far away from the cooling fan 200 and the air-discharge fan 150 shown in FIG. 4, inside the casing 100.

In some implementations, the blowing-guide 250 may extend between the air-discharge fan 150 and the cooling fan 200 in a second direction Y (Y axis direction) perpendicular to a first direction X (X axis direction), thereby to define an air-flow path. In some implementations, the blowing-guide 250 may include a plurality of plates extending in the second direction Y. The plates may be arranged in the first direction X and spaced apart in the first direction X. The number of the plurality of plates may vary.

A plurality of heat sinks (e.g., 315 of FIG. 7) may be disposed under a plurality of induction heating modules (e.g., IHM), respectively, to dissipate the heat from the corresponding induction heating module IHM.

Each of a plurality of heat pipes (e.g., HPs) may be configured to extend in the first direction X. The plurality of heat pipes (e.g., HPs) may be arranged to be spaced apart from each other in the second direction Y. In some implementations, each heat pipe HP may be configured to extend in the first direction X through heat sinks disposed in the same row. Thus, the heat pipe may discharge the heat dissipated from the heat sinks in the same row out of the plurality of induction heating modules (for example, IHMs).

The induction heating module JIM may be a stand-alone or independent module that is independently driven.

In some examples, the induction heating module may include a plurality of induction heating modules. The plurality of induction heating modules (e.g., IHM) may be arranged in the first direction X and second direction Y, as illustrated in FIG. 4, to implement a zone-free based inductive-heating device.

In some implementations, each of a plurality of induction heating modules (e.g., IHM) is independently driven. Thus, each working coil in each heating module is also controlled independently.

In some implementations, an indicator may be arranged to indicate whether the working coil in each induction heating module IHM is driven and the heating intensity of the working coil. Each indicator may also be controlled independently.

In this connection, referring to FIG. 6, the indicator is placed in a module casing 325 of a corresponding induction heating module IHM. That is, it may be confirmed referring to FIG. 6, that, for each indicator, four light guides 330 are housed within the corresponding module casing 325 of the induction heating module IHM.

In some implementations, the induction heating module IHM may be equipped with various components. Hereinafter, referring to FIGS. 7 to 9, the induction heating module IHM will be specifically described.

Figure 7:
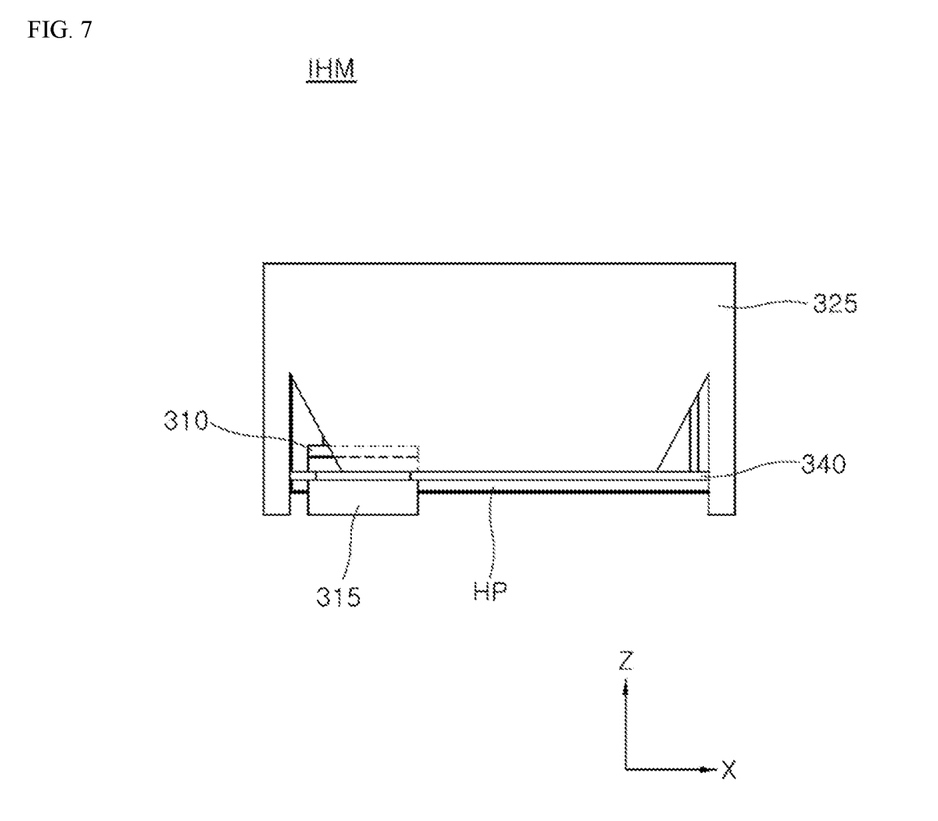
FIG. 7 is an enlarged side elevation view of an example induction heating module of FIG. 6.
Figure 8:
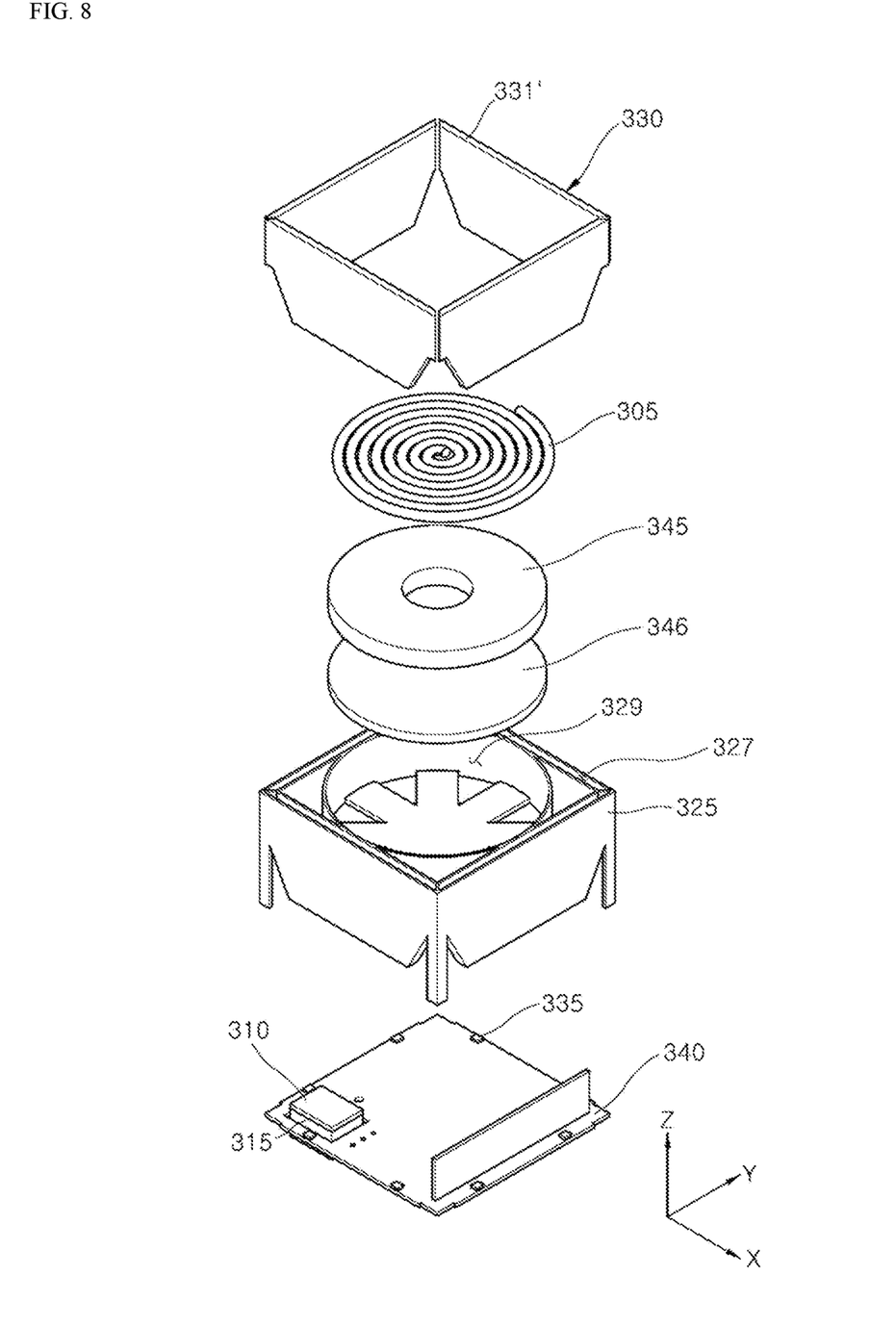
FIG. 8 is an exploded perspective view of an example induction heating module of FIG.
Figure 9:
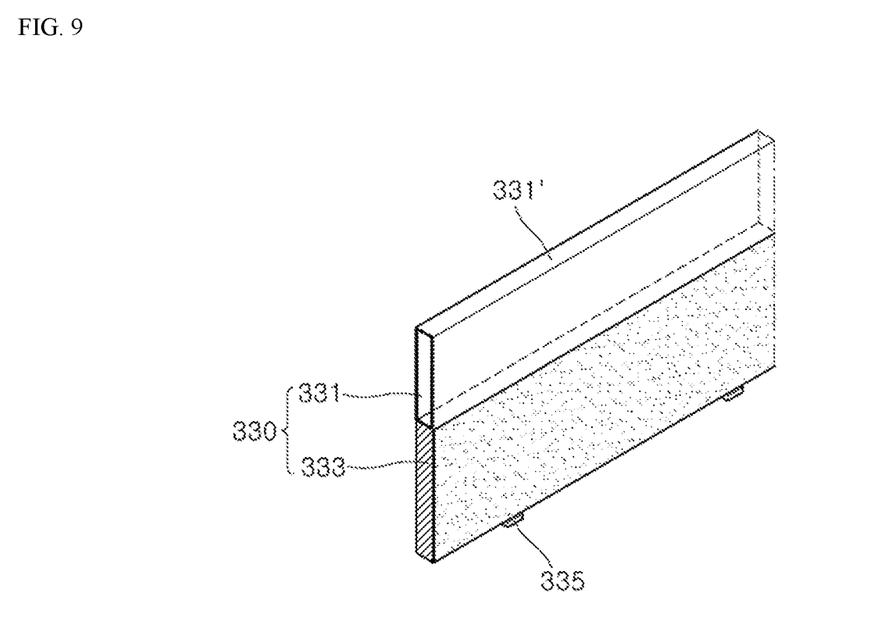
FIG. 9 is a partial perspective view to illustrate an example light guide and an example light emitting element of FIG. 8.

FIG. 7 is an enlarged side elevation view of an induction heating module of FIG. 6. FIG. 8 is an exploded perspective view of an induction heating module of FIG. 7. FIG. 9 is a partial perspective view to illustrate a light guide and a light emitting element of FIG. 8.

In some implementations, FIG. 9 is a perspective view of a single light guide of FIG. 8.

Referring to FIG. 7 to FIG. 9, the induction heating module IHM includes a working coil 305, an inverter 310, a ferrite core 345, an insulation member such as a thermally-insulating member 346, a module casing 325, a light emitting element 335, a control module 340, and a light guide 330.

In some implementations, although not illustrated in the figure, the induction heating module IHM may include units associated with driving the working coil 305. For example, the units associated with driving the working coil 305 may include a rectifier rectifying an AC power from the power supply to DC power, a DC link capacitor reducing a ripple of the rectified DC power from the rectifier, and a relay or a semiconductor switch which turns on or off the working coil 305. Concrete examples of those components will be omitted.

First, the working coil 305 may be formed of a wire wound by a plurality of turns in an annular shape, and may generate an AC magnetic field. Below the further working coil 305, the ferrite core 345 may be disposed.

The inverter 310 may apply a resonant current to the working coil 305 via a switching operation.

In some examples, the driving operation (i.e., switching operation) of the inverter 310 is controlled by the control module 340. The inverter includes first and second switching elements for performing switching operations. The inverter may apply a resonant current to the working coil 305 via switching operations of the switching elements.

In some implementations, each of the first and second switching elements may include an insulated gate bipolar transistor (IGBT). The heat sink 315 may be disposed below the inverter 310 (i.e. below the first and second switching elements). In some implementations, the inverter 310 may be arranged to be connected to the control module 340.

The ferrite core 345 may be disposed below the working coil 305 and may diffuse the AC magnetic field generated by the working coil 305. In some implementations, the ferrite core 345 may allow the direction of the AC magnetic field generated by the working coil 305 to be directed upwardly (that is, in a third direction Z perpendicular to a plane defined by the first and second directions X and Y).

The thermally-insulating member 346 may be disposed between the ferrite core 345 and the control module 340.

In some examples, the thermally-insulating member 346 is disposed below the ferrite core 345 (i.e., between the ferrite core 345 and the module casing 325). The thermally-insulating member 346 may block heat generated from heating of the loaded-object via driving of the working coil 305 from being transmitted downwardly (i.e., toward the light emitting element 335 or the control module 340).

In some implementations, the thermally-insulating member 346 may not be included in the induction heating module DIM. In this implementation of the present disclosure, an example is illustrated in which the thermally-insulating member 346 is included in the induction heating module IHM.

In some implementations, the working coil 305, the ferrite core 345, and the thermally-insulating member 346 may be stacked within an accommodation space 329 of the module casing 325, as illustrated in FIG. 8. The module casing 325 has the accommodation space 329 defined therein. The accommodation space 329 accommodates therein the stack of the working coil 305, the ferrite core 345, and the thermally-insulating members 346 therein. Guide-receiving grooves 327 (e.g., four grooves) in which light guides 330 to be described later are respectively inserted may be defined in the module casing 325 around the accommodation space 329.

In some implementations, the module casing 325 is disposed above the control module 340. Thus, a size of the module casing 325 may be determined depending on a size of the working coil 305, the ferrite core 345, the thermally-insulating member 346, the control module 340, and the like.

Each of the light emitting elements 335 may be disposed below each of the light guides 330 to emit light to each light guide 330.

In some examples, the operation of the light emitting element 335 may be controlled by the control module 340, and the light emitting element 335 may be placed on the control module 340. That is, the light emitting element 335 may be controlled not by a separate control module for driving the light emitting element, but by the control module 340 that controls driving of the inverter 310. In some implementations, the light emitting element 335 may be integrally coupled to the control module 340.

In some implementations, the light emitting element 335 may be, but is not limited to, a light emitting diode (LED), for example. In some implementations, a plurality of light emitting elements 335 may be disposed, as illustrated in FIG. 8. In this case, the light emitting elements may be arranged on the control module 340 to be spaced from each other at a predetermined distance.

The control module 340 may control the driving of the inverter 310 and the light emitting element 335.

In some examples, the control module 340 may be implemented, for example, as a printed circuit board (PCB). The light emitting element 335 and the inverter 310 may be disposed on the control module 340.

In some implementations, the light emitting element 335 may be integrally coupled to the control module 340, while the inverter 310 may be connected to the control module 340.

The light guides 330 may disposed around the corresponding working coil 305. The light guides may indicate, through a top light-emission face 331' thereof, whether the working coil 305 is driven and the output intensity of the working coil.

In some examples, under each light guide 330, a corresponding light emitting element 335 is disposed. Each light guide 330 may diffuse the light emitted from the corresponding light emitting element 335 through the top light-emission face 331' to the outside.

In some implementations, a plurality of light guides 330 may be provided. For example, four light guides 330 may be provided to be inserted and fixed in the guide-receiving grooves 327 defined in the module casing 325, respectively.

The light guide 330 may include an upper air-containing layer 331 and a lower acrylic layer 333, as illustrated in FIG. 9. That is, the upper space thereof may be filled with air while the lower space thereof may be filled with acrylic material. The top light-emitting face 331' may be defined as the top face of the air-containing layer 331.

That is, the upper portion of the light guide 330 defines the air-containing layer 331. This minimizes the effect of the heat generated by the heating of the loaded-object on the light guide 330.

In some implementations, a dimension in a vertical direction of the air-containing layer 331, that is, the dimension in the third direction Z, may be set equal to, for example, the vertical dimension of the acrylic layer 333. In this case, the light guiding effect by the light guide 330 may be optimized. Thus, using a small number of light emitting elements, light with brightness sufficient to be perceived by the user may be kept uniformly.

In some implementations, the lower layer 333 of the light guide 330 may be made not of an acrylic material but of transparent material, such as glass, or synthetic resin, such as polycarbonate, polyamide, polyimide or the like. However, in this implementation of the present disclosure, it is assumed that the lower layer 333 of the light guide 330 is made of an acrylic material.

In some implementations, the induction heating device 1 may also have a wireless power transfer function, based on the configurations and features as described above.

For example, the induction heating device 1 may utilize a technology for supplying power wirelessly. An electronic device with the wireless power transmission technology may charge a battery by simply placing the battery on a charging pad without connecting the battery to a separate charging connector. An electronic device to which such a wireless power transmission is applied does not require a wire cord or a charger, so that portability thereof is improved and a size and weight of the electronic device are reduced compared to the prior art.

Such a wireless power transmission system may include an electromagnetic induction system using a coil, a resonance system using resonance, and a microwave radiation system that converts electrical energy into microwave and transmits the microwave. The electromagnetic induction system uses an electromagnetic induction between a primary coil provided in a unit for transmitting wireless power (for example, a working coil) and a secondary coil included in a unit for receiving the wireless power.

The induction heating device 1 may heat the loaded-object via electromagnetic induction. Thus, the operation principle of the induction heating device 1 may be substantially the same as that of the electromagnetic induction-based wireless power transmission system.

In some implementations, the induction heating device 1 may have the wireless power transmission function as well as induction heating function.

In some implementations, an induction heating mode or a wireless power transfer mode may be controlled by the control module 340 for the induction heating module (or the control module for the input interface). Thus, if desired, the induction heating function or the wireless power transfer function may be selectively used.

As described above, in the induction heating device 1 according to one implementation of the present disclosure, each of the plurality of working coils may be independently controlled, thereby allowing the operation of each of the working coils to be finely controlled. By finely controlling the operation of each of the working coils, the heating region may also be finely controlled, which may improve user satisfaction.

In some implementations, in an induction heating device 1 according to one implementation of the present disclosure, the heat resistance and light emitting performances of the indicator (i.e., a combination of the light emitting element and the light guide) may be improved. As a result, the indicator damage due to heat may be minimized. In some implementations, with a small number of the light emitting elements, light with sufficient brightness for the user perception may be maintained uniformly.

In some implementations, in the induction heating device 1 according to one implementation of the present disclosure, the control module for the inverter may control the operations of the light emitting element and the inverter, thereby simplifying the structure of the indicator. As a result, the manufacturing cost and yield due to the reduction in the number of components may be improved. In some implementations, when the indicator is broken, it is easy to repair the indicator.

The detailed advantageous effects according to the present disclosure as well as the aforementioned effect have described above with regard to the implementations of the present disclosure. The present disclosure described above may be variously substituted, altered, and modified by those skilled in the art to which the present disclosure pertains without departing from the scope and sprit of the present disclosure. Therefore, the present disclosure is not limited to the above-mentioned exemplary implementations and the accompanying drawings.

What is claimed is:

1. An induction heating device comprising:
a casing;
a cover plate coupled to a top of the casing, the cover plate having a surface configured to seat an object; and
a first induction heater located within the casing,
wherein the first induction heater comprises:
  a working coil configured to heat the object on the cover plate,
  an inverter configured to apply a resonant current to the working coil,
  a light guide located outside of the working coil, the light guide comprising a light-emission surface that is located at a top of the light guide, that is configured to indicate whether the working coil is driven, and that is configured to indicate an intensity of the working coil,
  a light emitter located vertically below the light guide and configured to emit light to the light guide, and
  a controller comprising a printed circuit board (PCB), the controller being configured to control the inverter and the light emitter, wherein the light emitter and the inverter are disposed on the PCB of the controller.

2. The induction heating device of claim 1, wherein the light guide comprises an upper layer that accommodates air and a lower layer that is made of an acrylic material.

3. The induction heating device of claim 2, wherein a vertical length of the upper layer is equal to a vertical length of the lower layer.

4. The induction heating device of claim 2, wherein the light-emission surface is a top surface of the upper layer.

5. The induction heating device of claim 1, further comprising a heat sink located vertically below the first induction heater and configured to dissipate heat from the first induction heater.

6. The induction heating device of claim 5, wherein the inverter comprises a first switch and a second switch that are located vertically above the heat sink and that are configured to perform a switching operation to apply the resonant current to the working coil.

7. The induction heating device of claim 6, wherein each of the first switch and the second switch includes an insulated gate bipolar transistor (IGBT).

8. The induction heating device of claim 1, further comprising:
a second induction heater located within the casing, wherein the first induction heater and the second induction heater are arranged in a first direction; and
a third induction heater located within the casing, wherein the first induction heater and the third induction heater are arranged in a second direction perpendicular to the first direction.

9. The induction heating device of claim 1, wherein the first induction heater further comprises:
a ferrite core located vertically below the working coil and configured to diffuse magnetic field generated from the working coil; and
an insulation member that is located between the ferrite core and the controller and that is configured to reduce heat transfer to the controller.

10. The induction heating device of claim 9, wherein the first induction heater further comprises a casing that defines an accommodation space configured to accommodate the working coil, the ferrite core, and the insulation member that are vertically stacked,
wherein the casing further defines a guide-receiving groove around the accommodation space, and
wherein the light guide is configured to insert into and couple to the guide-receiving groove.

11. The induction heating device of claim 10, wherein a top surface of the light guide is flush with a top surface of the module casing in a state in which the light guide is inserted in the guide-receiving groove.

12. The induction heating device of claim 1, wherein the light guide comprises a plurality of light guides that each have a planar shape, each light guide being configured to cover a side of the working coil.

13. The induction heating device of claim 12, wherein each light guide comprises an upper layer that accommodates air and a lower layer that is made of an acrylic material, the upper layer being configured to reduce heat transfer from the object on the cover plate.

14. The induction heating device of claim 1, wherein the light emitter comprises a plurality of light emitters that are spaced apart from each other and that are located at a side of the working coil.

15. An induction heating device comprising:
a casing;
a cover plate coupled to a top of the casing, the cover plate having a surface configured to seat an object; and
a plurality of induction heaters located within the casing;
wherein each induction heater comprises:
  a working coil configured to heat the object on the cover plate,
  an inverter configured to apply a resonant current to the working coil,
  a light guide located outside of the working coil, the light guide comprising a light-emission surface that is located at a top of the light guide, that is configured to indicate whether the working coil is driven, and that is configured to indicate an output intensity of the working coil,
  a light emitter located vertically below the light guide and configured to emit light to the light guide, and
  a controller comprising a printed circuit board (PCB) that is configured to mount the light emitter and the inverter, the controller being configured to control the inverter and the light emitter.

16. The induction heating device of claim 15, wherein each induction heater further comprises:
a ferrite core located vertically below the working coil and configured to diffuse magnetic field generated from the working coil; and
an insulation member that is located between the ferrite core and the controller and that is configured to reduce heat transfer from the object to the controller.

17. The induction heating device of claim 16, wherein each induction heater further comprises a casing that defines an accommodation space configured to accommodate the working coil, the ferrite core, and the insulation member that are vertically stacked,
wherein the casing further defines a guide-receiving groove around the accommodation space, and
wherein the light guide is configured to insert into and couple to the guide-receiving groove.

18. The induction heating device of claim 15, wherein the plurality of induction heaters include:
a first induction heater;
a second induction heater that faces the first induction heater, wherein the first induction heater and the second induction heater are arranged in a first direction; and a third induction heater that faces the first induction heater, wherein the first induction heater and the third induction heater are arranged in a second direction perpendicular to the first direction.

19. An induction heating device comprising:
a casing;
a cover plate coupled to a top of the casing, the cover plate having a surface configured to seat an object; and
a first induction heater located within the casing,
wherein the first induction heater comprises:
- a working coil configured to heat the object on the cover plate,
- an inverter configured to apply a resonant current to the working coil,
- a light guide located outside of the working coil, the light guide comprising a light-emission surface that is located at a top of the light guide, that is configured to indicate whether the working coil is driven, and that is configured to indicate an intensity of the working coil,
- a light emitter located vertically below the light guide and configured to emit light to the light guide,
- a controller comprising a printed circuit board (PCB), the controller being configured to control the inverter and the light emitter,
- a ferrite core located vertically below the working coil and configured to diffuse magnetic field generated from the working coil, and
- an insulation member that is located between the ferrite core and the controller and that is configured to reduce heat transfer to the controller.

* * * * *